Dec. 20, 1932.  P. C. LAWSON ET AL  1,891,284
UNDERCUTTING MACHINE
Filed Feb. 2, 1929    3 Sheets-Sheet 2

Inventor
Paul C. Lawson.
Conrad B. Schafer.
By Frank Fraser
Attorney

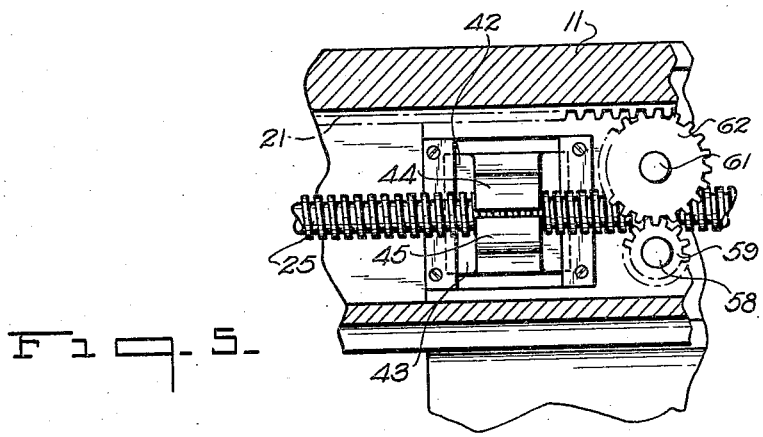
Fig. 5.
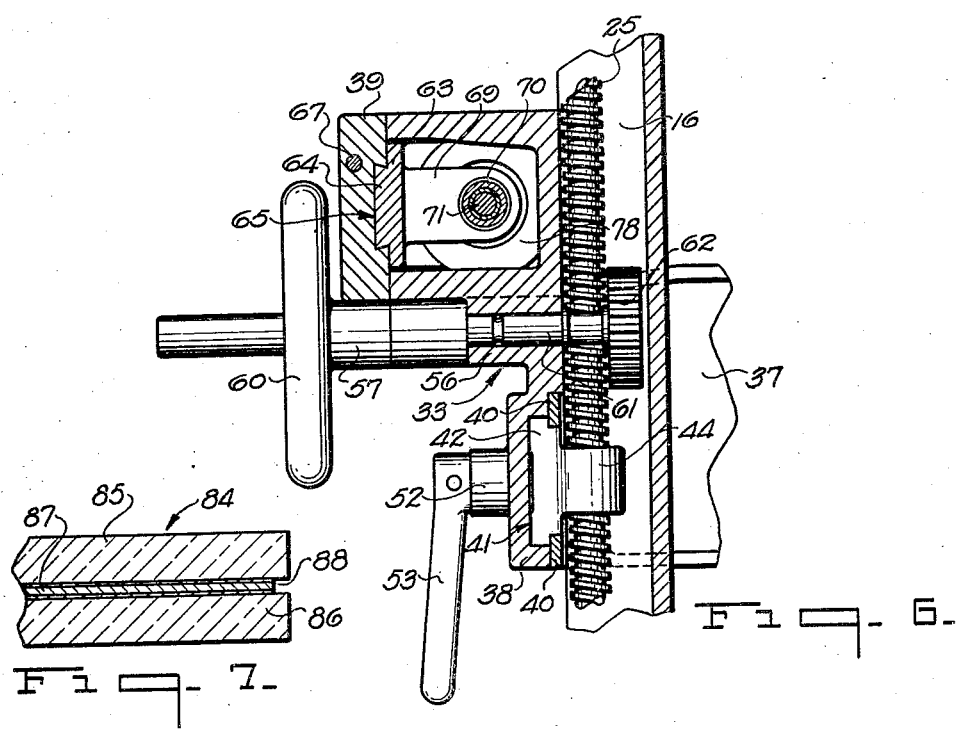
Fig. 6.
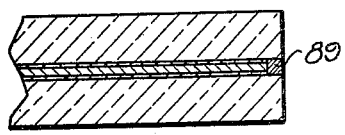
Fig. 7.
Fig. 8.
Inventor
Paul C. Lawson.
Conrad B. Schafer.
By Frank Fraser
Attorney Patented Dec. 20, 1932

1,891,284

UNITED STATES PATENT OFFICE

PAUL C. LAWSON AND CONRAD B. SCHAFER, OF TOLEDO, OHIO, ASSIGNORS TO LIBBEY-OWENS-FORD GLASS COMPANY, OF TOLEDO, OHIO, A CORPORATION OF OHIO

UNDERCUTTING MACHINE

Application filed February 2, 1929. Serial No. 337,159.

The present invention relates broadly to apparatus for use in the manufacture of laminated glass and more particularly to apparatus for grooving or undercutting laminated glass sheets to prepare them for sealing.

Laminated sheet glass ordinarily comprises two or more sheets of glass and one or more sheets of a suitable non-brittle material such as for instance a cellulose composition material. There are numerous methods by which the several laminations can be joined together but in practically all cases, a suitable cement or bonding material is used for this purpose. The quality of the laminated sheet is largely dependent upon and determined by the character of the bond between the several laminations. In order for a sheet of laminated glass to be satisfactory and of real commercial value, it must be able to withstand heat and cold, vibration, etc. One of the difficulties encountered is that of "let-goes" and which is a term used to designate a separation in the laminations. Obviously, if the laminations become separated or parted, the utility and practicability of the laminated sheet is greatly diminished. The "let-goes" above referred to, ordinarily, although of course not always, have their inception at the border portions of the sheet and work inwardly due to the action of the atmosphere, etc., upon the cement or bonding material. To prevent this separation of the laminations, it is therefore important, or at least desirable, to seal the edges of the laminated sheet so as to protect the bond between the laminations. This sealing of the laminated sheet is rendered somewhat difficult due to the necessity of removing a portion of the inner non-brittle sheet or membrane to provide a groove or channel around the edges of the laminated sheet to allow for the insertion of a suitable sealing material capable of withstanding the action of the elements.

An important object of the invention is to provide an improved apparatus for grooving or undercutting laminated sheet glass wherein, after the laminations comprising the sheet of laminated glass have been bonded together, a predetermined amount of the non-brittle or inner lamination may be removed from around the edges of the sheet to permit the insertion of a sealing material designed to protect the bond between the laminations whereby to prevent a separation thereof.

Another object of the invention resides in the provision of apparatus designed to permit mechanical removal of the non-brittle material and wherein the laminated sheet is adapted to be held in a stationary or fixed position and the grooving or undercutting apparatus moved relative thereof.

A further object of the invention resides in the provision of apparatus of this character whereby the grooving or undercutting of the laminated sheet may be readily and conveniently effected in a thorough and efficient manner and with the expenditure of a minimum amount of time and labor.

Still another object of the invention resides in the provision of apparatus of this character embodying certain novel features of construction, arrangement and operation, all of which will be more readily hereinafter apparent and particularly pointed out in the claims.

Other objects and advantages of the invention will become more apparent during the course of the following description when taken in connection with the accompanying drawings.

In the drawings forming a part of this application and wherein like numerals are employed to designate like parts throughout the same, Fig. 1 is a front view of a grooving or undercutting apparatus constructed in accordance with the present invention.

Fig. 5 is a section taken substantially on line 5—5 of Fig. 3.

Fig. 6 is a section taken substantially on line 6—6 of Fig. 2.

Fig. 7 is a sectional view of a portion of a sheet of laminated glass after the undercutting operation but prior to sealing, and Fig. 8 is a similar view showing the sheet after the sealing material has been inserted in the edge thereof.

Figure 1:
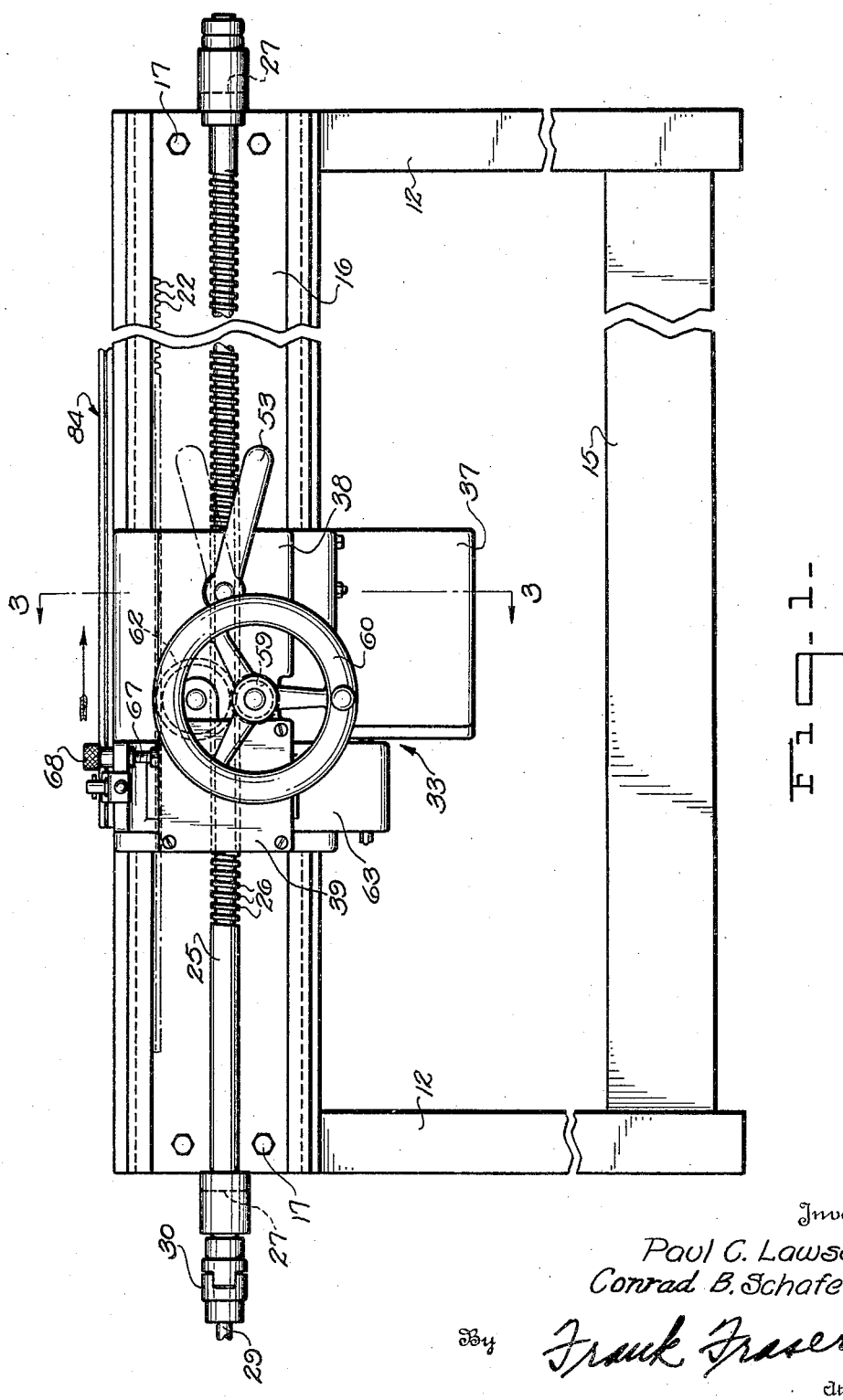

Referring more particularly to the drawings, the grooving or undercutting apparatus herein provided comprises a table for supporting the laminated sheet to be grooved, said table being designated in its entirety by the numeral 10, and comprising a horizontal top 11 supported at opposite ends by the spaced front and rear vertical legs 12 and 13. The legs at either end of the table are preferably connected by the upper and lower transverse cross pieces 14—14, and the opposed legs at opposite ends of the table may be connected adjacent their lower ends by the longitudinally extending member 15. The table may, of course, be braced or strengthened in any other manner as desired and the present invention is not to be restricted to the use of the particular type of table herein disclosed.

Arranged along the front of the table 10 and extending longitudinally thereof is a vertically disposed guide member 16 secured to the front legs 12 of said table by means of bolts or the like 17. The guide member 16 may also be provided at its upper end with a rearwardly directed flange 18 received within a corresponding notch 19 in the forward edge of the table top 11, said flange being secured to the table by bolts or the like 20 which pass downwardly therethrough. The heads of the bolts are counter-sunken so as not to project above the upper surface of the table. The upper surface of the guide member 16 is adapted to be coincident with the upper surface of the table top.

Carried by the guide member 16 is a longitudinally extending rack bar 21 provided with the downwardly facing teeth 22. This rack bar may be secured within a groove 23 formed in the guide member by means of screws or the like 24. Also extending longitudinally within the guide member 16 is a screw shaft 25 having threads 26 formed thereon, said shaft being journaled at its opposite ends in bracket plates 27—27 preferably secured to the front legs 12 of table 10 by bolts or the like 28. The screw shaft 25 is adapted to derive its power from a drive shaft 29, connected thereto by a universal or other connection 30.

The guide member 16 is provided at its upper outer edge with a longitudinally extending groove 31 and at its lower outer edge with a substantially similar groove 32. Slidably carried by the guide member 16 is a support or carriage designated in its entirety by the numeral 33. This carriage is provided at its upper edge with a rearwardly projecting flange 34 shaped to fit snugly within the groove 31 in guide member 16. Carried at the lower end of the carriage is a longitudinally extending bar or guide piece 35 shaped to fit snugly within groove 32. This bar is preferably removably secured in place by bolts or the like 36 which pass upwardly through the casting and are threaded within openings therein. The bar 35 is removable for the reason that upon sliding movement of the carriage 33 upon the guide member 16, the greatest wear will take place at this point. Naturally, the bar will therefore tend to wear away more rapidly than the other parts of the apparatus and must consequently be replaced at intervals as it becomes worn. The carriage 33 is provided at its lower end with a rearwardly projecting, substantially horizontal platform 37, the purpose of which will be fully hereinafter apparent.

The carriage 33 consists of a minor portion 38 and a major portion 39 respectively. The minor portion 38 of the carriage carries the vertical plates 40—40 which cooperate to form a vertical slideway 41. Slidably mounted for vertical movement within this slideway are the upper and lower plates 42 and 43 respectively carrying the gripping members or jaws 44 and 45 disposed at opposite sides of the shaft 25 and provided upon their inner adjacent faces with suitable threads adapted to engage and mesh with the threads 26 on shaft 25. The upper plate 42 is provided with depending projections 46 and 47 which interfit with the upwardly extending projections 48 and 49 carried by lower plate 43. Disposed between the plates 42 and 43 is a cam member 50 mounted upon a shaft 51, said shaft being journaled within the bearing portion 52 and carrying at its outer end the operating handle or lever 53.

Figures 3, 4:
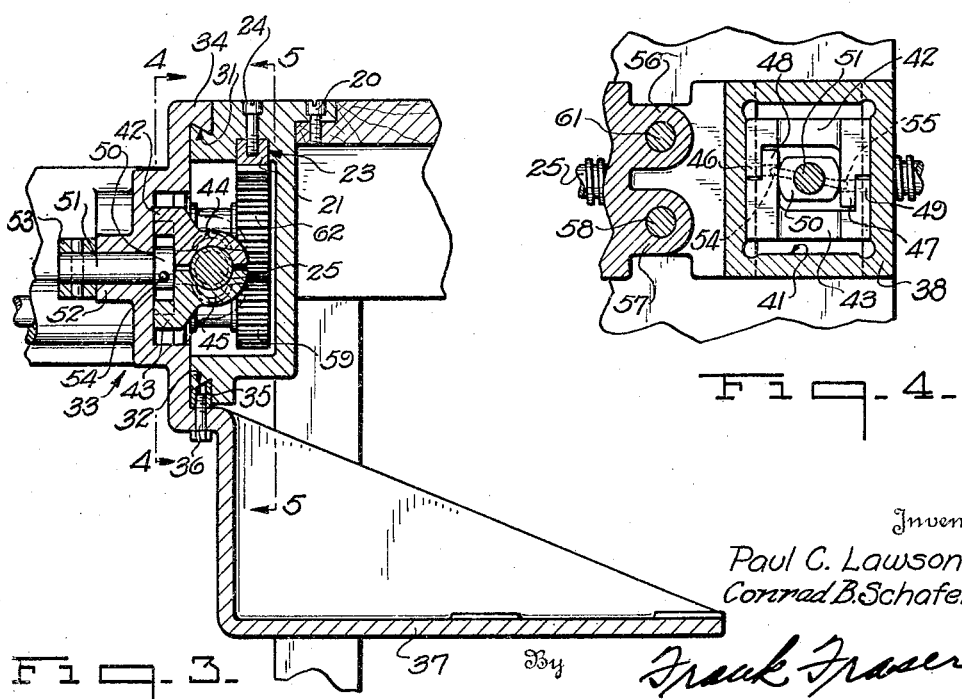
Fig. 3 is a section taken substantially on line 3—3 of Fig. 1.
Fig. 4 is a section taken substantially on line 4—4 of Fig. 3.

The cam member 50 carries oppositely disposed pins 54 and 55 which are received within openings in the projections 47 and 48 of the plates 42 and 43 respectively. When the cam member is in the position illustrated in Fig. 4, the gripping members or jaws 44 and 45 are in closed position and in operative engagement with the shaft 25. And when so positioned, the lever 53 is in its lowered full line position indicated in Fig. 1. However, upon raising of the lever to its broken line position, the cam member 50 will be rotated in a counterclockwise direction to move the plates 42 and 43 apart, and when this is done, the gripping members 44 and 45 will, of course, likewise be moved apart to disengage the screw shaft 25.

The major portion 39 of the carriage 33 has formed thereon the upper and lower bearing portions 56 and 57 in substantial vertical alignment with one another. Journaled within the lower bearing portion 57 is a shaft 58 carrying at its inner end a spur gear 59 and at its outer end a hand wheel 60. Journaled within the upper bearing portion 56 is a shaft 61 having keyed to its inner end the spur gear 62 meshing with the lower spur gear 59 and also with the teeth 22 of rack bar 21. It will be noted that the shafts 58 and 61 are disposed at opposite sides of the screw shaft 25 and that the gears 59 and 62 are arranged inwardly thereof. The purpose of this construction will be more fully hereinafter described.

The particular undercutting machine herein provided is also carried by the major portion 39 of the carriage 33 and comprises a bracket support 63 provided with a tongue 64 slidably received within the vertical groove 65 in the carriage. The bracket support 63 is provided at its upper end with the angular extension 66 shown in Fig. 2 through which operates a threaded shaft 67 provided with the knurled operating portion 68, the shaft being threaded within an opening in the carriage, and by rotation of the knurled portion 68, the bracket support 63 may be raised or lowered vertically as desired to effect vertical adjustment of the cutting tool as will be hereinafter apparent. The tongue and groove portions of the supports are of sufficient length to give rigidity to the machine.

Extending laterally from the bracket support 63 is a plurality of vertically spaced arms 69 (only one being shown) through which extends a sleeve member 70 suitably held against accidental displacement. Journaled within the sleeve member 70 is a vertically disposed shaft 71 of greater length than the said sleeve member. This shaft carries at its upper end the undercutting or grooving tool 72 detachably held in position by means of a threaded screw 73. Also carried by the upper end of the shaft 71 is a removable ring member 74 under which is arranged a spring 75 encircling the shaft 71 and bearing at its opposite ends against the ring and sleeve member. The size and strength of the spring is such that it will readily support the shaft and the parts carried thereby.

Associated with the lower end of the shaft 71 is a driving mechanism which comprises an arm 76 carrying the crank pin 77 receivable in an opening in the pulley 78 eccentrically thereof, said pulley being rotatable about a shaft carried by the angular extension 79 of bracket support 63. Trained about the pulley 78 is a belt 80 deriving its power from a motor 81 mounted upon the supporting platform 37. Mounted above the arm 76 is a detachable ring 82 and spring 83, the ring being designed to prevent accidental displacement of the spring. It will be seen from this construction that the shaft 71 and thus the grooving tool 72 is free to float vertically within the sleeve member 70. The size of the upper spring 75 is such that it will support the shaft and other parts carried thereby and yet it is of sufficient resiliency to permit free floating of the shaft. As the lower spring 83 does not carry any weight, its size is relatively less than the upper spring. However, the springs are balanced so that the grooving tool will readily adapt itself to the sheet of laminated glass being worked upon. While one particular type of cutting machine has been herein generally referred to, it is to be understood that the invention is not to be restricted to the specific type of cutter disclosed.

Figure 2:
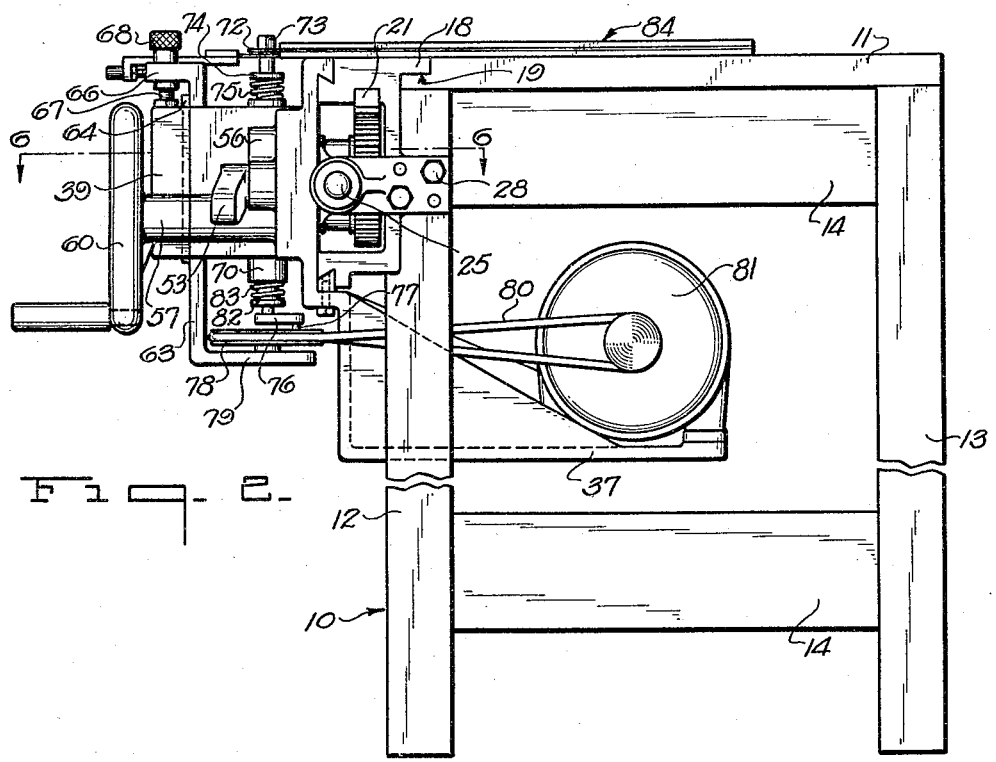
Fig. 2 is an end view thereof.

In the operation of the undercutting apparatus herein provided, the carriage 33 and likewise the parts carried thereby are first moved along the guide member 16 to one end of the table and for the purpose of illustration, let us assume the left-hand end thereof. While in this position, the shaft 25 is idle and the sheet of laminated glass 84 to be undercut or grooved is placed in a horizontal position upon the top 11 of table 10 so that the edge thereof to be worked upon projects slightly forwardly beyond the guide member 16 as shown in Fig. 2. By referring particularly to Fig. 7, it will be noted that the laminated sheet 84 consists of the two outer sheets of glass 85 and 86 and the inner non-brittle sheet or membrane 87. After the laminated sheet has been properly placed in position upon the table, the shaft 25 is rotated in the direction indicated by the arrow in Fig. 1 and the lever 53 actuated to move the gripping members or jaws 44 and 45 into operative engagement with the shaft 25 as described hereinabove. Upon continued rotation of the shaft 25, the carriage 33 will be advanced to the right whereby to carry the cutting tool relative to the laminated sheet. Simultaneously, the cutting tool 72 is driven upon operation of motor 81 and as the cutting machine is carried along in proximity to the sheet, the tool engaging the non-brittle sheet 87 will serve to cut away the same and in this manner form a groove or channel 88 in the sheet edge. When the cutting machine has completed the grooving of the sheet, the rotation of shaft 25 is stopped and the lever 53 raised to disengage the gripping members 44 and 45 from the screw shaft 25. The operator then grasps the hand wheel 60 and turns the same whereby to cause rotation of the spur gears 59 and 62. Upon proper rotation of these gears, the spur gear 62 meshing with the rack bar 21 will effect movement of the carriage and tool rearwardly in the opposite direction to return the cutting tool to its starting position at the left-hand end of the table. The remaining edges of the sheet may then be treated in the same manner after which a suitable sealing material 89 is adapted to be arranged within the grooves 88 to protect the bond between the laminations.

It is to be understood that the form of the invention herewith shown and described is to be taken as the preferred embodiment of the same, and that various changes in the

We claim:

1. An apparatus for undercutting laminated sheet glass, including a table for supporting the laminated sheet, a cutting tool adapted for engagement with the sheet to undercut the same, a carriage for the tool slidably carried by the table, gripping members carried by said carriage, means carried by said table and with which the gripping members are engageable for effecting movement of the tool and carriage in one direction relative to the sheet during the undercutting thereof, and means having cooperating portions carried by said carriage and table for effecting movement of the carriage and tool in the opposite direction to return said tool to its starting position.

2. An apparatus for undercutting laminated sheet glass, including a table for supporting the laminated sheet, a cutting tool adapted for engagement with the sheet to undercut the same, a carriage for the tool slidably carried by the table, gripping members carried by said carriage, a screw shaft carried by said table and engageable by said gripping members to effect movement of the carriage and cutting tool relative to said sheet during the undercutting thereof, and means for moving said gripping members into and out of engagement with said shaft.

3. An apparatus for undercutting laminated sheet glass, including a table for supporting the laminated sheet, a cutting tool adapted for engagement with the sheet to undercut the same, a carriage for the tool slidably carried by the table, gripping members carried by said carriage, a screw shaft carried by said table and engageable by said gripping members to effect movement of the carriage and cutting tool in one direction relative to said sheet during undercutting thereof, means for moving the gripping members into and out of engagement with said shaft, and means having cooperating portions carried by said carriage and table for effecting movement of the carriage and cutting tool in the opposite direction to return said tool to its starting position.

4. An apparatus for undercutting laminated sheet glass, including a table for supporting the laminated sheet, a guide member carried by the table and extending longitudinally thereof, a carriage slidably carried by the guide member, a cutting tool mounted upon the carriage and adapted for engagement with the sheet to undercut the same, gripping members carried by the carriage, a screw shaft also carried by the table and extending substantially parallel with the guide member, said shaft being engageable by the gripping members to effect movement of the carriage and tool relative to the sheet during undercutting thereof, and means for moving the gripping members into and out of engagement with said shaft.

5. An apparatus for undercutting laminated sheet glass, including a table for supporting the laminated sheet, a guide member carried by the table and extending longitudinally thereof, a carriage slidably carried by the guide member, a cutting tool mounted upon the carriage and adapted for engagement with the sheet to undercut the same, means for moving the carriage and tool in one direction relative to the sheet during undercutting thereof, and means for moving the carriage and tool in the opposite direction to return said tool to its starting position after the undercutting operation embodying a rack bar carried by the guide member and extending longitudinally thereof, a plurality of gears carried by said carriage, said gears meshing with one another and one of the gears meshing with said rack bar, and means for positively rotating one of said gears.

6. An apparatus for undercutting laminated sheet glass, including a table for supporting the laminated sheet, a guide member carried by the table and extending longitudinally thereof, a carriage slidably carried by the guide member, a cutting tool mounted upon the carriage and adapted for engagement with the sheet to undercut the same, gripping members carried by said carriage, means carried by the table and engageable by the gripping members to effect movement of the tool and carriage in one direction relative to the sheet during undercutting thereof, and means for moving the carriage and tool in the opposite direction to return said tool to its starting position after the undercutting operation embodying a rack bar carried by the guide member and extending longitudinally thereof, a plurality of gears carried by said carriage, said gears meshing with one another and one of the gears meshing with said rack bar, and means for positively rotating one of said gears.

7. An apparatus for undercutting laminated sheet glass, including a table for supporting the laminated sheet, a fixed guide member carried by the table and extending longitudinally thereof, a carriage slidably carried by the guide member, a cutting tool mounted upon the carriage and adapted for engagement with the sheet to undercut the same, gripping members carried by the carriage, a screw shaft carried by the table and extending substantially parallel with the guide member, said shaft being engageable by the gripping members to effect movement of the carriage and cutting tool in one direction relative to the sheet during undercutting thereof, means for moving the gripping members into and out of engagement with said shaft, and means for moving the carriage and cutting tool in the opposite direction to return said tool to its starting position after the undercutting operation embodying a rack bar carried by the guide member and extending longitudinally thereof, a plurality of gears carried by said carriage, said gears meshing with one another and one of the gears meshing with said rack bar, and means for positively rotating one of said gears.

8. An apparatus for undercutting laminated glass consisting of two sheets of glass and an interposed non-brittle membrane, including means for supporting the laminated sheet, and a rotatable freely floating tool adapted to be received between the two glass sheets of said laminated structure and movable relative to said sheet for undercutting the same.

9. An apparatus for undercutting laminated glass consisting of two sheets of glass and an interposed non-brittle membrane, including means for supporting the laminated sheet, and a rotatable freely floating tool adapted to be received between the two glass sheets of said laminated structure, carried by said supporting means, and movable relative to said sheet for undercutting the same.

Signed at Toledo, in the county of Lucas, and State of Ohio, this 29th day of January, 1929.

PAUL C. LAWSON.
CONRAD B. SCHAFER.